United States Patent [19]

Stovall

[11] Patent Number: 4,809,138

[45] Date of Patent: Feb. 28, 1989

[54] TAILLIGHT ASSEMBLY FOR BOAT TRAILERS

[76] Inventor: Fred J. Stovall, 1607 Cynthia St.; St. Mary, Franklin, La. 70538

[21] Appl. No.: 205,746

[22] Filed: Jun. 13, 1988

[51] Int. Cl.[4] .................................................. B60Q 1/30
[52] U.S. Cl. ...................................... 362/61; 362/287; 362/427
[58] Field of Search ............... 280/414.1; 362/61, 66, 362/83, 269, 285, 287, 418, 427

[56] References Cited

U.S. PATENT DOCUMENTS

| | | | |
|---|---|---|---|
| 3,788,502 | 1/1974 | Bell | 214/84 |
| 3,868,030 | 2/1975 | Bell | 214/84 |
| 3,885,146 | 5/1975 | Whitley, Jr. | 240/7.1 R |
| 4,091,442 | 5/1978 | Markey | 362/427 X |
| 4,286,309 | 8/1981 | Rasinski | 362/61 |
| 4,395,749 | 7/1983 | Poveromo | 362/83 |
| 4,422,664 | 12/1983 | Poveromo | 280/414.1 |
| 4,471,410 | 9/1984 | Nakano | 362/65 |

FOREIGN PATENT DOCUMENTS 1806228  5/1970  Fed. Rep. of Germany ... 280/414.1

Primary Examiner—Stephen F. Husar
Attorney, Agent, or Firm—Reginald F. Roberts, Jr.

[57] ABSTRACT

A taillight assembly for boat trailers. The assembly comprises a taillight, and means for mounting the taillight on a trailer. Means are provided for raising and lowering the taillight from and to lower and higher elevations, without manually adjusting the position of the taillight, and while keeping the taillight pointed in a horizontal direction rearward of the trailer. The lower elevation is useful in transporting the boat, and the higher elevation is useful for launching the boat. Keeping the taillight pointed horizontal and rearward of the trailer ensures that the light will be visible both on the road, and while launching and reloading the boat onto the trailer. Means are provided for holding the taillight at the first and second elevations.

9 Claims, 3 Drawing Sheets

TAILLIGHT ASSEMBLY FOR BOAT TRAILERS

BACKGROUND OF THE INVENTION

The present invention relates to boat trailers. More particularly, the invention relates to a taillight assembly for boat trailers.

Recreational vehicles such as boats are usually transported from one location to another by use of a towed trailer on which the vehicle is mounted. Typically, these trailers are towed by a family automobile having a towing rig mounted at the back end of the automobile.

Laws in many states require that vehicle lighting systems be mounted at the rear end of the trailer. These systems include night-driving lights, backing lights, and braking lights.

The specific locations across the rear end of the trailer, and the heights above the ground at which the lights are mounted, vary from vehicle to vehicle. Invariably, however, the positioning is such that that significant problems are encountered when the recreational vehicle carried by the trailer is a boat.

Launching of a boat mounted on such a trailer is usually accomplished in the following manner. A ramp is provided at the launch site. The ramp angles downward into the water, and the trailer may be backed down the ramp until the boat is in a position with respect to the surface of the water at which the boat, when means securing it to the towed trailer are removed, will be floatably supported on the surface of the water. A portion of the trailer is necessarily submerged during this launch procedure.

Even if the sloping of the launching ramp is gradual, the lighting system of the trailer is likely to become submerged by the time the boat is in a position to be released. Since the trailer is backed to this release position, the backing lights are on during the performance of the launching maneuver. Depending upon the extent of prior use of the lights and the length of time in completing the maneuver, the lights may become very hot. There can, therefore, be a significant temperature differential between the lights and the water. Frequently, because of this temperature difference, the light bulbs explode. Even in warmer bodies of water where the the temperature differential is not sufficient to cause explosion of the lights, direct exposure to the water can induce corrosion of the metal components of the lighting fixtures. Corrosion will be particularly acute when the trailer is backed into a body of salt water. Moreover, the damage to and safety involved in the exposure of electrical wiring to water and more particularly to salt water, are obvious and significant.

If, on the other hand, the taillight is mounted well above the trailer to eliminate contact with water at launching, another problem is created: the arm or other support on which the taillight is mounted vibrates severely due to the lever arm created and the normal road irregularities.

The present invention addresses and solves these and other problems associated with taillights mounted on boat trailers.

SUMMARY OF THE INVENTION

In general, the present invention provides a taillight assembly for a boat trailer. The assembly comprises a taillight for the trailer and means for mounting the taillight on the trailer. Means are provided for raising the taillight from a first elevation useful in transporting a boat to a second elevation useful for launching the boat, and for lowering the taillight from the second elevation to the first elevation, while keeping the taillight pointed in a horizontal direction rearward of the trailer without manually adjusting the position of the taillight. Also included are means for holding the taillight at the first and second elevations.

DESCRIPTION OF THE PREFERRED EMBODIMENTS

Each taillight assembly includes a taillight mounted on a pivotable frame. One such assembly is mounted on each side of a boat trailer, and is permanently or detachably fastened to the frame of the trailer.

The pivotable frame for the taillight assembly comprises first and second substantially parallel, elongated, rigid members, pivotally connected at one end to first and second vertical rigid members by first and second pivot pins, respectively. The vertical members are fastened to a horizontal base which is mounted on the frame of the boat trailer. The vertical members are offset from one another both horizontally and vertically.

Figure 1:
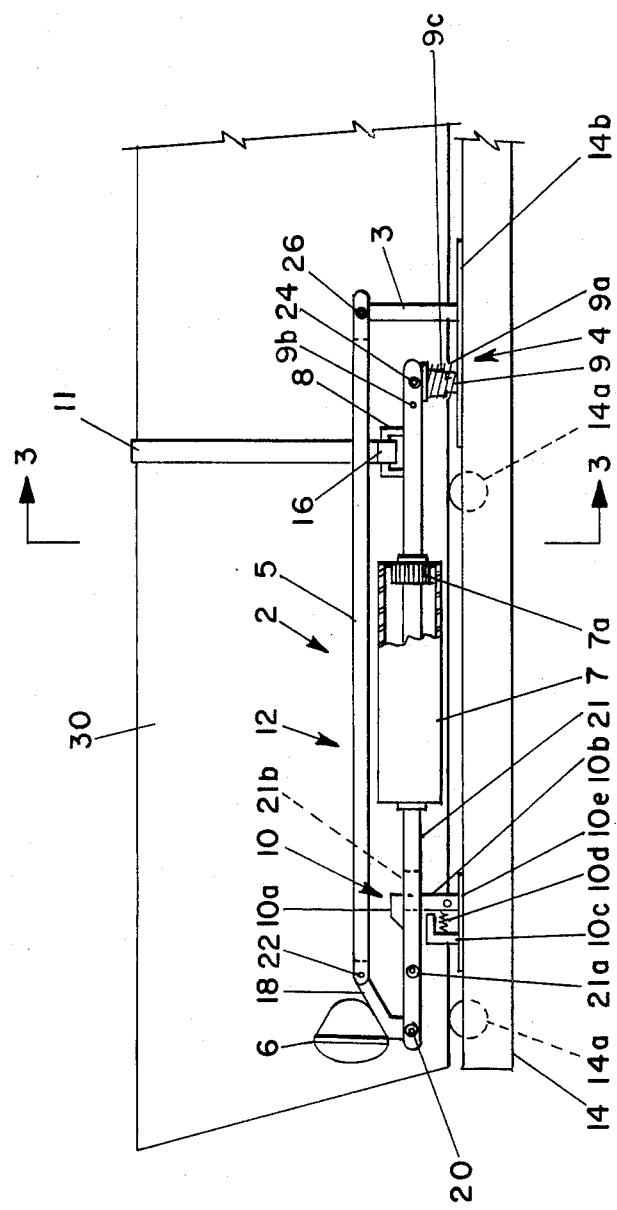
FIG. 1 is a side elevation of a taillight assembly made in accordance with the principles of the present invention, showing the taillight assembly in a horizontal configuration.

More specifically, reference is made to FIG. 1, which shows a taillight assembly, generally designated by the numeral 2, made in accordance with the principles of the present invention. An electric lamp 6 which serves as a taillight is mounted on a pivotable frame 12 which is in turn mounted on the frame 14 of a boat trailer (not shown). The frame 12 comprises first and second substantially parallel, elongated, rigid members 21 and 5, respectively. The first and second elongated rigid members 21 and 5 are pivotally connected at one end to first and second vertical rigid members 9 and 3 by first and second pivot pins 24 and 26, respectively. The vertical members 9, 3 are offset from one another both horizontally and vertically, and are fastened to the trailer frame 14 by a first plate 14b.

At their other ends the elongated members 21, 5 are connected to one another by a pivotable member 18, which supports the taillight 6, by third and fourth pivot pins 20 and 22, respectively. The straight-line distance between the first and second pivot pins 24 and 26 is substantially equal to the straight-line distance between the third and fourth pivot pins 20 and 22. The straight-line distance between the first and third pivot pins 24 and 20 is substantially equal to the straight-line distance between the second and fourth pivot pins 26 and 22. This geometry ensures that the taillight 6 is always pointed in a horizontal direction rearward of the trailer as the taillight is shifted between first and second elevations.

The taillight 6 is fastened to the pivotable member 18 in a configuration such that the beam of the lamp is directed away from the first and second vertical members 9 and 3, and lies in a plane parallel to the base of the taillight assembly 2, the base comprising first and second plates 14b and 10e. A roller 7 is mounted on the first elongated rigid member 21. The roller 7 rests on bearings 7a, and is disposed substantially in the middle of the first elongated member 21. The taillight 6 is provided with electrical connections (not shown) to a source of electricity, preferably on the towing vehicle (not shown).

Figure 2:
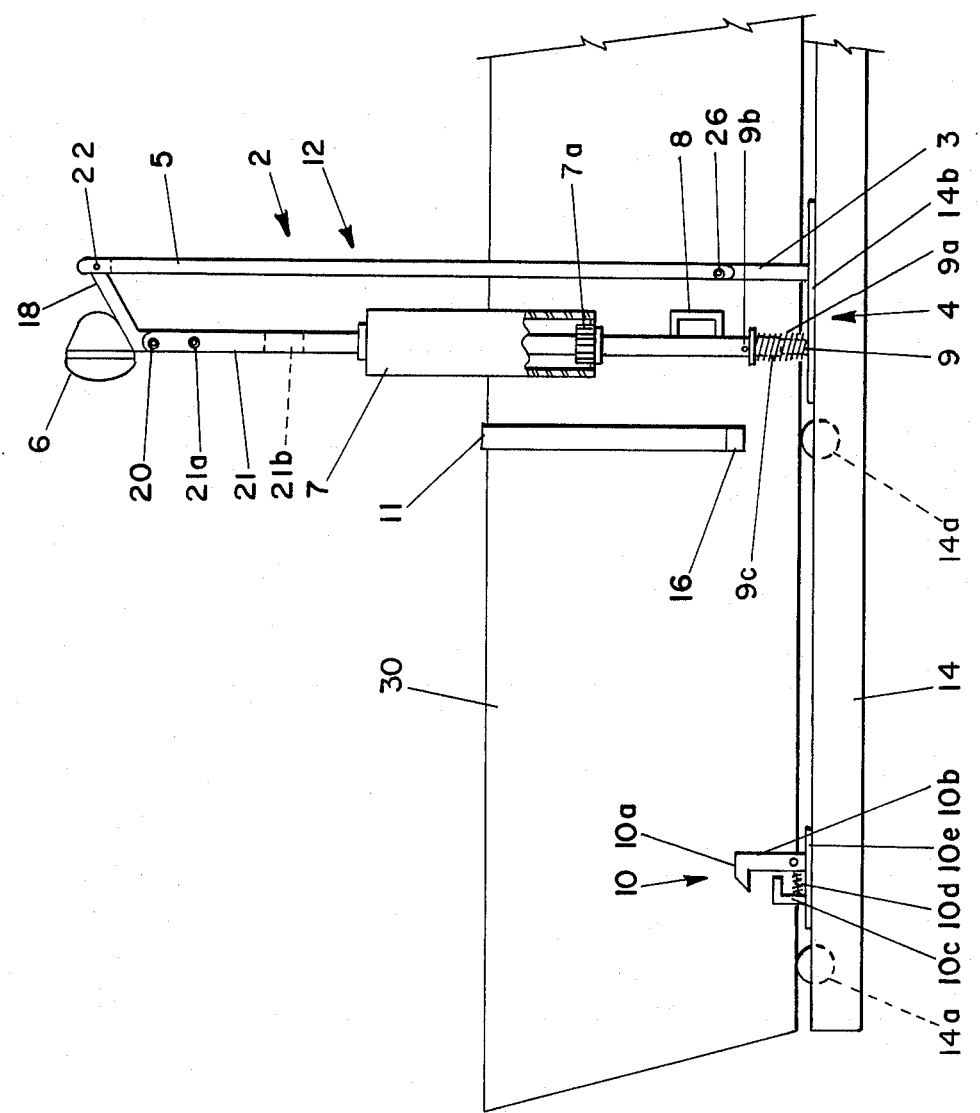
FIG. 2 is a side elevation of the same taillight assembly in a vertical configuration.
Figure 3:
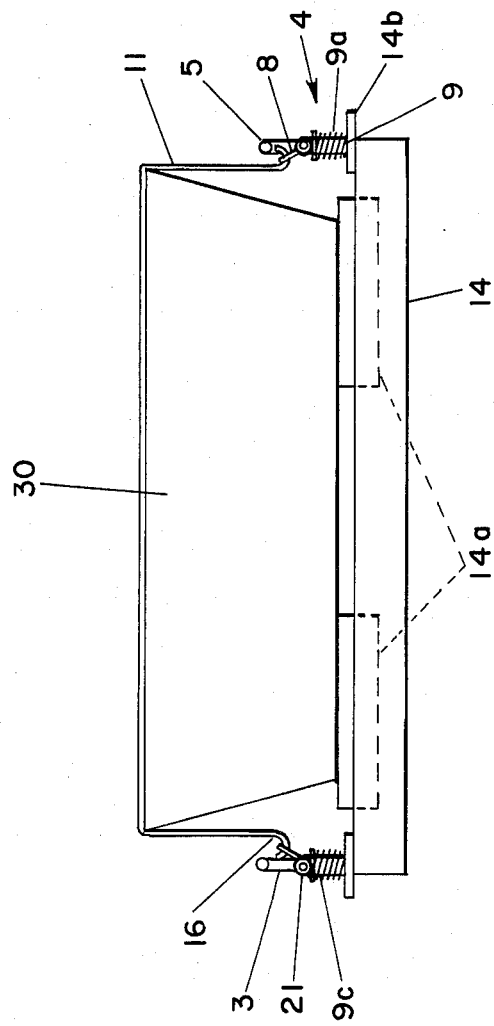
FIG. 3 is a cross-sectional view of FIG. 1, taken along the cutting line 3—3.

As shown in FIGS. 1-3, means are provided for fastening a boat 30 to the frame 14 of the trailer. One such means includes an elongated flexible member such as a strap 11 which is attached to one of the pivotable frames 12 by a hook 16 and an annular member 8, crosses over the boat 30 and the trailer frame 14, and is secured by a hook 16 which engages the annular member 8 on the pivotable frame 12 disposed on the opposite side of the trailer. The strap 11 can beneficially be detached when not in use, as shown in FIG. 2.

In FIG. 1, the taillight assembly 2 is shown in a horizontal configuration. FIG. 2 shows the assembly 2 in a vertical configuration. The transition from horizontal to vertical configurations is effected by pivoting the first and second elongated members 21 and 5 through an arc of approximately ninety degrees. The horizontal configuration is used in transporting a boat, e.g., from home to launching site. The vertical configuration is used for launching the boat in the water, and for reloading the boat on the trailer. The horizontal configuration is used for the return trip home. The transition from vertical to horizontal configuration is accomplished by rotating the first and second elongated members downward through the same vertical arc of approximately ninety degrees. It is critical, for the purpose of the present invention, that the taillight is kept always pointed in a horizontal direction rearward of the trailer in effecting the horizontal-to-vertical and vertical-to-horizontal transitions. This objective is achieved by the designed geometry disclosed hereinabove. The advantage is clear. The taillight 6 provides illumination and a point of reference for maneuvering the boat in and out of the water, while at the same time raising the taillight to an elevation such that water will not come in contact with the lamp 6 or its electrical connections. It is likewise critical that, by means of the above-disclosed geometry, the transitions and constant-direction requirement can be achieved without manually adjusting the taillight.

While it is possible and feasible to secure and hold the elongated members 21, 5 in their vertical and horizontal positions by, for example, providing sufficient frictional resistance to the required rotations, it is preferable to provide means for locking the members 21, 5 into their horizontal and vertical positions. FIGS. 1 and 2 illustrate a horizontal locking device and a vertical locking device.

A preferred device for locking the members 21, 5 in a horizontal configuration is shown in FIGS. 1 and 2 at 10. The horizontal locking device 10 comprises a horizontal portion or lip 10a; a vertical portion 10b; an L-shaped member 10c; and a spring 10d connecting the vertical portion 10b to the L-shaped members 10c, to keep the device 10 in a locked configuration until the spring 10d is released. The device 10 is fastened to the frame 14 of the trailer by a second plate 10e; and is locked by depressing the member 21, causing the member 10a to protrude through a slot 21b in the member 21.

Means for locking the members 21, 5 into a vertical configuration are shown in FIGS. 1 and 2 at 4. The vertical locking device 4 comprises the first vertical member 9, a sleeve 9c, a spring 9a, and a stop-pin 9b.

The first rigid elongated member 21 beneficially includes a handle 21a.

The invention as just described provides means for removing taillight assemblies of boat trailers from contact with water. This advantage is accomplished by unlocking the taillight assembly 2 from a horizontal position, rotating it ninety degrees from its horizontal position (first elevation) to a vertical position (second elevation), and locking it into its vertical position. The automatic locking device 4 will engage the hinged end of the first elongated member 21, thereby locking the members 21 and 5 in a vertical position by means of the sleeve 9c which is urged against the stop-pin 9b by the spring 9a. Both the sleeve 9c and the spring 9a are preferably cocylindrical with the vertical member 9, in order to facilitate locking and unlocking the members 21, 5. When locked in the vertical position, the taillight 6 is approximately one-and-one-half to two feet above the original horizontal or road position above the boat 30. Because of the geometry of the taillight assembly 2, the taillight 6 will always face the rear of the boat trailer. The taillights 6 will thereby provide a reference guide under conditions of low visibility or darkness; e.g., a nocturnal launching.

Affixed to the first elongated members 21, the free-turning rollers 7 serve to direct and guide the boat 30 when the boat is being loaded on or off the trailer, when the elongated members 21, 5 are locked in their vertical position.

The annular member 8 is located so as to provide an approximately four-to-one mechanical advantage when the strap 11 is used to fasten a boat to a trailer. When the boat 30 has been loaded on the trailer, and the trailer removed from the water, the vertical locking device 4 is released, and the members 21, 5 are lowered to the horizontal. As the members 21, 5 are lowered, a very high degree of tension is impressed on the strap 11. When the members 21, 5 are horizontal, the horizontal locking device 10 is engaged, locking the members 21, 5 into a horizontal configuration with great tension on the strap 11 securing the boat 30 to the frame 14 of the trailer. This aspect of the invention is an important safety feature, the taillight assembly 2 acting in this capacity as a safety binder, particularly during road travel. Locking the members 21, 5 into the horizontal position during road travel also provides a safety feature by eliminating vibration of the taillight 6, which occurs in the prior-art practice of mounting the taillight on a rigid stem that projects vertically above the boat in order to avoid water hazard when the boat is unloaded and launched. Moreover, this prior-art practice causes the stem on which the light is mounted to protrude above the sides of the boat, thereby causing a snagging hazard when material is being loaded on or unloaded from the trailer.

Still another problem which the present invention solves is the danger of backing prior-art taillight assemblies into foreign objects when the light is mounted permanently on a vertical, rigid stem. Together with the solution of the aforementioned problem of vibration during road travel, which in the present state of the art creates havoc with the lighting fixtures, bulbs, and related wiring as the vibrations are transmitted through the stem and amplified to produce whiplike movement of the stem, these solutions of the snagging and backing hazards by the present invention amount to a remarkable safety achievement.

I claim:

1. A taillight assembly for a boat trailer, comprising:
   (a) a taillight for the trailer;
   (b) means for mounting the taillight on the trailer;
   (c) means for raising the taillight from a first elevation useful in transporting a boat to a second elevation useful for launching the boat, and for lowering the taillight from the second elevation to the first elevation, while keeping the taillight pointed in a horizontal direction rearward of the trailer without manually adjusting the position of the taillight; and
   (d) means for holding the taillight at the first and second elevations.

2. The taillight assembly of claim 1, further comprising:
   (e) automatic means for locking the taillight into the first and second elevations.

3. The taillight assembly of claim 1, further comprising:
   (e) means for fastening a boat to the trailer.

4. The taillight assembly of claim 3, wherein the means for fastening the boat to the trailer include:
   (f) a flexible member having a length such that when disposed above the boat and attached to a second taillight assembly on the opposite side of the boat, the flexible member will be drawn taut when both taillights are disposed at the first elevation.

5. The taillight assembly of claim 2, wherein the means for locking the taillight into the first elevation include:
   (f) first and second interconnected elongated, rigid members which in combination support the taillight, the first and second elongated members parallel to one another, the first member lying below the second member when the members are horizontal, the first member including a notch to receive part of a locking device; and
   (g) a locking device comprising a horizontal portion; and vertical portion; and L-shaped member; and a spring connecting the vertical portion to the L-shaped member, to keep the device locked until the spring is released, the horizontal portion of the device sized to protrude through the notch in the first elongated rigid member when the device is locked.

6. The taillight assembly of claim 1, wherein the means for mounting the taillight on the trailer comprise:
   (e) a pivotable frame fastened to the frame of the trailer.

7. The taillight assembly of claim 6, wherein the pivotable frame comprises:
   (f) first and second substantially parallel, elongated, rigid members, pivotally connected at one end to first and second vertical rigid members by first and second pivot pins, respectively, the vertical members offset from one another both horizontally and vertically, the rigid elongated members connected to one another at their other ends by a pivotable member by third and fourth pivot pins, respectively.

8. The taillight assembly of claim 7, wherein the means for raising the taillight from the first elevation to the second elevation, and for lowering the taillight from the second to the first elevation comprise:
   (g) means for fastening the taillight to the pivotable member in a configuration such that the beam from the taillight is directed in a horizontal direction rearward of the trailer.

9. The taillight assembly of claim 8, wherein the straight-line distance between the first and second pivot pins is substantially equal to the straight-line distance between the third and fourth pivot pins, and the straight-line distance between the first and third pivot pins is substantially equal to the straight-line distance between the second and fourth pivot pins, thereby ensuring that the taillight remains pointed in a horizontal direction rearward of the trailer as the position of the taillight is interchanged between the first and second elevations.

* * * * *